Patented Jan. 10, 1928.

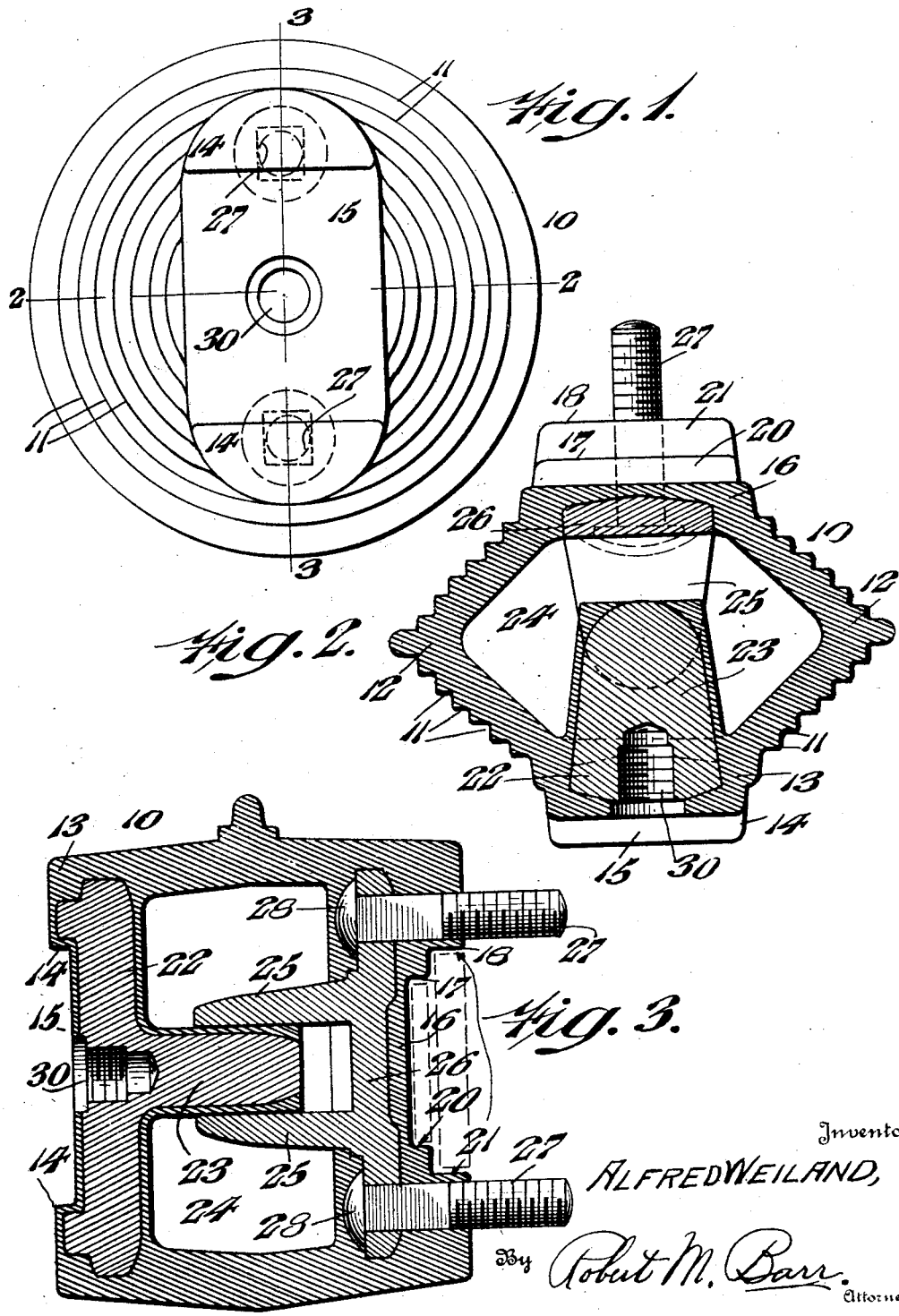

1,655,777

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

VEHICLE BUMPER CUSHIONING DEVICE.

Application filed December 11, 1926. Serial No. 154,167.

The present invention relates to devices for absorbing and neutralizing shocks, and more particularly to an improvement upon the construction and operation of shock absorbers of Patents No. 1,579,185, and No. 1,579,188, granted to applicant March 30, 1926.

Some of the objects of the present invention are to provide an improved shock absorbing or shock cushioning means for use more particularly with vehicle bumpers; to provide a rubber or rubberized fabric body for association with an impact bar of a vehicle bumper to reduce and minimize received impacts; to provide a cushioning device wherein there is a relative proportioning of resistance to applied force of impact; to provide a cushioning device to supplement the action of a vehicle bumper wherein a yielding shock absorbing action takes place under direct impact while end thrusts or impacts acting to cause relative side to side movement of the cushioning device will be positively resisted; to provide a cushioning element having provision for receiving and supporting parts of a vehicle bumper; to provide a cushioning element having provision for receiving and supporting parts to which the element is attached; and to provide other improvements as will hereinafter appear.

In the accompanying drawings, Fig. 1 represents an end elevation of one form of bumper cushion embodying the present invention; Fig. 2 represents a section on line 2—2 of Fig. 1; and Fig. 3 represents a section on line 3—3 of Fig. 1.

Referring to the drawings, one form of the present invention consists of rubber or rubberized fabric or any other resilient material molded as a hollow body 10 of generally elliptical section, as seen in Fig. 2. Preferably the upper and lower outwardly converging walls of the body 10 are corrugated or concentrically fluted, as shown at 11. In this connection it should be noted that the apex area 12 of the body 10 is circumferentially of increased thickness with respect to the wall area, and this provides a medial resistance which causes the walls 11 to work, under applied shocks, with a breathing action to gradually dampen such shocks.

For strengthening the body 10 along its impact receiving portion, it is formed with a relatively thick face wall 13 having projecting shoulders 14 which provide a transverse groove 15 arranged to seat an impact bar of the vehicle bumper of which the cushioning body 10 forms a part. Likewise the opposite or rear portion of the body 10 is formed as a relatively thick face wall 16 which is preferably provided with stepped shoulders 17 and 18 to form respectively transverse grooves 20 and 21 to accommodate parts of the bumper structure.

In order to reinforce the face walls 13 and 16 and also to provide a means to resist movement of the bumper impact under end thrust, the face wall 13 is molded about a metal insert 22 which conforms generally to the contour of the face wall 13 and has an axially disposed tongue 23 projecting well into the central portion of the inner chamber 24 of the body 10. This tongue 23 is also enveloped in the material of the body 10 and thus has a cushion contact with a bifurcated extension 25 formed integral with an insert 26 molded into the face 16. Incidental to the molding of the insert is the molding in also of a plurality of bolts 27 which pass through the insert 26 with their heads 28 flush against the inner sides thereof while their threaded shanks protrude from the rear face 16 for mounting the body as will be understood. The insert 22 is axially bored to form a tapped hole 30 for the reception of a suitable fastening bolt by which the impact bar of the bumper or any other part is attached.

From the foregoing it will be apparent that a complete unitary cushioning device has been devised, which while more particularly useful in conjunction with vehicle bumpers is of general application as a shock absorbing, or shock resisting, or shock minimizing unit. Preferably the body 10 is molded as hollow and with a compressible medium such as air sealed therein, since this gives the body a desirable inner reinforcement to increase the dampening effect of the device as a whole. It should also be noted that the attaching walls of the device are molded to provide transverse grooves for seating certain cooperating parts such as a bumper impact bar and supporting arms from the vehicle frame. These grooved walls are not only fully reinforced and strengthened by internally molded metal inserts but these inserts have an interfitting sliding relation so designed as to permit full cushioning effect for direct impacts but resisting and preventing side sway or movement transverse to the normal direction of the applied impact force.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A shock absorber comprising a body of resilient material having an impact receiving face provided with a transverse groove to seat an impact member, a metal insert molded into said face for reinforcement and means for attaching the opposite face of said body to a vehicle frame or other part.

2. A shock absorber comprising a body of resilient material having an impact receiving face and an attaching face, said attaching face being formed with a transverse groove to seat a supporting part, a metal insert molded in said attaching face, and means cooperating with said insert for securing said attaching face to a vehicle frame or other part with said supporting part held in said groove.

3. A shock absorber comprising a body of resilient material having an impact receiving face and an attaching face, said attaching face being formed with two transverse grooves to respectively seat supporting parts, a metal insert molded into said attaching face, and means cooperating with said insert for securing said attaching face to a vehicle frame or other part with said supporting parts held in said grooves.

4. A shock absorber comprising a body of resilient material having an impact receiving face provided with a transverse groove to seat an impact member and an attaching face provided with a transverse groove to seat a supporting part, a metal insert molded into said impact face, a metal insert molded into said attaching face, and means cooperating with said attaching face insert for securing said attaching face to a vehicle frame or other part with said supporting part held in said attaching face groove.

5. A shock absorber comprising a body of resilient material having an impact receiving face provided with a transverse groove to seat an impact member and an attaching face provided with a transverse groove to seat a supporting part, a metal insert molded into said impact face, a metal insert molded into said attaching face, means cooperating with said attaching face insert for securing said attaching face to a vehicle frame or other part with said supporting part held in said attaching face groove, and interfitting means between said inserts to resist relative movement between said inserts in a predetermined direction.

6. A shock absorber comprising a body of resilient material of substantially elliptical form in cross section and having its opposite walls exteriorly stepped in concentric relation, an impact receiving face formed at one side of said body, an attaching face formed at the opposite side of said body, metal inserts respectively molded into said faces, and interfitting sliding connections between said inserts.

7. A shock absorber comprising a body of resilient material having an impact receiving face provided with a transverse groove and a bolt hole, a metal insert molded into said face having a tapped hole aligned with said bolt hole, and means for attaching the opposite face of said body to a vehicle frame or other part.

8. A shock absorber comprising a hollow body of resilient material having an impact receiving face provided with a transverse groove and a bolt hole, a metal insert molded into said face having a tapped hole aligned with said bolt hole, and means for attaching the opposite face of said body to a vehicle frame or other part.

9. A shock absorber comprising a hollow body of resilient material having an impact receiving face and an attaching face, said attaching face being formed with two transverse grooves to respectively seat supporting parts, a metal insert molded into said attaching face, and means cooperating with said insert for securing said attaching face to a vehicle frame or other part with said supporting parts held in said grooves.

Signed at Philadelphia, county of Philadelphia, State of Pennsylvania, this 10th day of December, 1926.

ALFRED WEILAND.